July 23, 1963     K. R. TORLUEMKE     3,098,602

THERMAL CENTRIFUGAL COMPRESSOR

Filed Sept. 12, 1962

INVENTOR.
Keith R. Torluemke
BY
Fred C. Matheny
ATTORNEY.

United States Patent Office 3,098,602
Patented July 23, 1963

3,098,602
THERMAL CENTRIFUGAL COMPRESSOR
Keith R. Torluemke, Rte. 1, Box 351–D,
Fall City, Wash.
Filed Sept. 12, 1962, Ser. No. 223,153
4 Claims. (Cl. 230—1)

My invention relates to a thermal centrifugal compressor.

An object of my invention is to provide a thermal centrifugal gas compressor which is capable of generating substantially any desired pressure, and is especially well adapted for the generation of high pressures, and to provide a compressor which will not be damaged if the gas therein becomes liquefied by pressure.

Another object is to provide a compressor which requires very little mechanical power to operate, is inherently quiet in operation, and one which can be accurately balanced for smooth and vibrationless operation.

Another object is to provide a compressor of simple, efficient and inexpensive construction in which the number of moving parts are reduced to a minimum, the need for precision machinery is eliminated, and in which there are no valves or piston rings to leak or wear out.

Further objects are to provide a compressor which does not require any lubrication in the compressor itself thereby eliminating the possibility of gas contaminating the lubricant or being contaminated by the lubricant, this being important in handling corrosive or oxidizing gases, especially at high temperatures and pressures.

In accordance with my invention gas is compressed in a continuous tube in a rapidly rotating housing by the combined or joint action or effect of centrifugal force and change of temperature which alternately subjects the gas to higher and lower pressure and to higher and lower temperature. The shape of the housing can be varied as long as it is well balanced and properly mounted for high speed rotation and as long as the gas tube is continuous and is disposed within and carried by the housing.

Other objects of my invention will be apparent from the following description and accompanying drawings.

In the drawings—

Like reference numerals refer to like parts throughout the several views.

Figure 1:
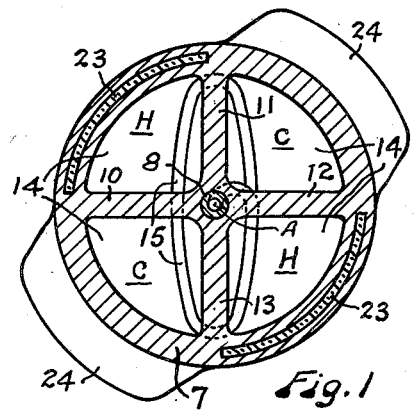
FIGURE 1 is a cross sectional view with parts in elevation and parts omitted showing a compressor constructed in accordance with my invention.

FIGS. 1 to 4 inclusive show an embodiment of my invention comprising a housing 7 mounted for high speed rotation by a suitable shaft 8 and provided with partitions 10, 11, 12 and 13 which divide the interior of said housing into a plurality of sections or compartments 14, alternately marked H and C to indicate hot and cold.

A helix formed of a continuous pipe or tube 15 is provided in the housing 7. This helix is of flattened or elliptical shape in end elevation or cross section. The tube 15 which forms said helix terminates at one end in an inlet part 16 and at the other end in an outlet part 17, both preferably axially positioned. The helix tube 15 extends through the partition walls 10, 11, 12 and 13 and alternately approaches close to and recedes away from the axis of rotation A of the housing 7 and each complete elliptical turn of the helix tube 15 passes through the four compartments 14, which are alternately hot and cold.

The hot and cold compartments 14 can be kept hot and cold respectively by any suitable means. For example, but not by way of limitation, an electric heating element 18, FIG. 3, can be provided in the alternate compartments 14 which are marked H, and connected by suitable wires 20 and slip rings 21, see also FIG. 4, with source of electrical energy wires 22. Preferably thermal insulation 23 is provided in or on the walls of the housing 7 externally of the H compartments 14. Also the partitions 10, 11, 12 and 13 can be similarly heat-insulated if desired. The alternate compartments 14 marked C, can be cooled by providing thin spaced apart cooling fins 24 on the walls of the housing 7 external to these compartments 14, or by circulating a cooling fluid through said C compartments 14.

When this compressor is rotated at high speed centrifugal force will cause the gas pressure at the periphery of the housing 7 to be greater than the pressure close to the axis of rotation by an amount proportional to the density of the gas. If the gas moves slowly enough through the helix tube 15 to assume substantially the same temperature as the hot and cold compartments or sections through which it passes then compression of the gas will take place when the entire unit is rotated.

Figure 2:
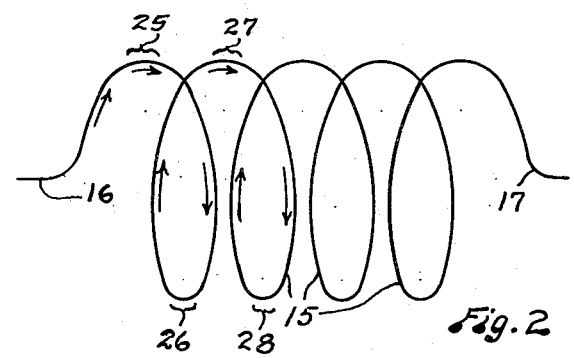
FIG. 2 is a line diagram illustrative of a gas tube in the form of a coil used in my compressor.
Figure 3:
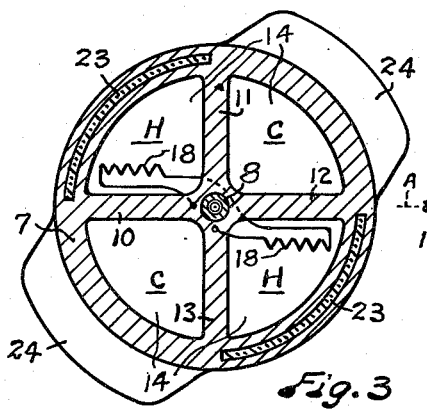
FIG. 3 is a cross sectional view similar to FIG. 1 showing heating means capable of use in alternate chambers of the compressor, the gas tube being omitted.
Figure 4:
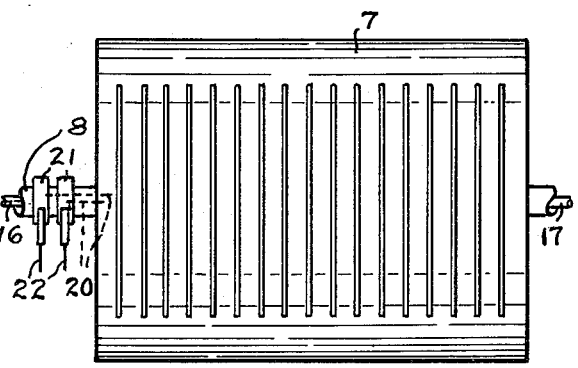
FIG. 4 is an elevation of my compressor illustrating electrical connections thereto and showing cooling fins on the exterior thereof.

Due to the joint action of centrifugal force and the changing density of the gas incident to changes of temperature the pressure at 25, FIG. 2, will be greater than the pressure at inlet 16, the pressure at 26 will be greater than the pressure at 25, the pressure at 27 will be greater than the pressure at 26, the pressure at 28 will be greater than the pressure at 27, and so on for each turn of the helix. If the hot compartments H are kept at about twice the absolute temperature of the cold compartments C then each turn of the helix will roughly be equivalent to one stage or impeller of a conventional centrifugal compressor.

Figure 5:
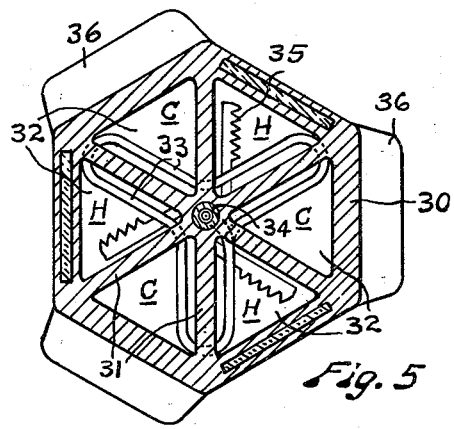
FIG. 5 is a cross sectional view, with parts in elevation, showing a compressor having a housing and a tubular coil of modified form.

FIG. 5 discloses a modified form of this invention comprising a housing 30 of hexagonal cross section provided with six equally spaced apart radial partitions 31 dividing said housing 30 into six similar compartments 32, alternately marked H and C to indicate hot and cold. A continuous tube 33 in the form of a helix is disposed within the housing 30. The helix formed by the tube 33 is shaped so that when it is viewed in end elevation or cross section it presents three symmetrical lobes. Said tube 33 extends repeatedly through the partitions 31 so that one half of each lobe is disposed in a hot compartment and the other half is disposed in an adjacent cold compartment. The housing 30 is rotatively mounted by a shaft 34 and alternate compartments 32 of said housing are provided with heating means 35 and cooling means 36, which can be similar to those shown in FIGS. 1, 3 and 4 and hereinbefore described. The operation of the compressor unit shown in FIG. 5 is similar to the operation of the unit shown in FIGS. 1 to 4.

Figure 6:
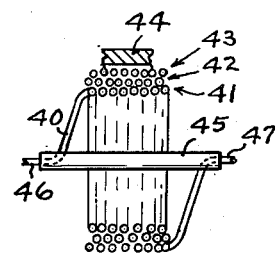
FIG. 6 is a fragmentary diagrammatic view illustrating a compressor constructed in accordance with my invention and in which more than one layer of coiled tubing is used.

FIG. 6 illustrates a modified form of my invention in which a continuous tube 40 is wound in overlapping layers 41, 42 and 43 to provide a greater number of stages of compression within a compressor of a given length. The layers 41, 42 and 43 are disposed within a housing 44, a fragment of which is shown and which may be similar to the housing 7. Said layers 41, 42 and 43 are concentric relative to a shaft 45 by which the housing 44 is rotatively mounted. The multiple layer tube 40 would be provided with an inlet end portion 46 and an outlet end portion 47 and can obviously be provided with any desired number of layers.

My compressor differs materially from other thermal compressors in that it uses a continuous length of tubing in which the gas travels and is compressed by stages. This tubing can be in the form of an elliptical helix or its form can be varied. It passes alternately through hot and cold sections of a housing by which it is carried and rotated to subject the gas therein to temperature changes and centrifugal pressure. Important advantages of my continuous tube compressor are that it minimizes the number of pipe joints required and makes it possible and practical to provide for a very large number of stages of compression, thereby making it possible to attain very high compression of the gas. In the event the gas is liquefied in the higher stages of compression the liquefied gas will not, in any way, damage the compressor. Obviously my compressor construction can also be utilized in the art of vacuum creating.

The foregoing description and accompanying drawings clearly disclose preferred embodiments of my invention but it will be understood that this disclosure is merely illustrative and that changes may be made within the scope of the following claims.

I claim:

1. In a thermal centrifugal compressor, a rotatively driven housing; alternate hot and cold sections in said housing; and a continuous helical tube in said housing extending alternately through said hot and cold sections, said tube extending back and forth in said housing between positions which are alternately near the axis and near the periphery of said housing.

2. A thermal centrifugal compressor comprising a rotatively driven housing; a plurality of alternate hot and cold compartments provided within said housing around the axis thereof; and a continuous helical tube of heat conductive material disposed within and carried by said housing and passing successively through alternate hot and cold compartments, the helix formed by said tube being shaped to provide parts which alternately are closer to and farther away from the axis of said housing.

3. A thermal centrifugal compressor comprising a rotatively driven housing; radial walls in said housing dividing the same into a plurality of compartments; means capable of heating alternate compartments; means capable of cooling the other alternate compartments; and an elliptically shaped helically coiled tube of heat conductive material disposed within the housing and passing through the successive heated and cooled compartments, said tube extending back and forth in said housing between positions which are alternately near the axis and near the periphery of said housing.

4. In a thermal centrifugal compressor, a rotatively driven housing; alternate hot and cold sections in said housing; and a continuous helical tube wound in a plurality of overlapping layers disposed in said housing extending alternately through said hot and cold sections, said tube extending back and forth in said housing between positions which are alternately near the axis and near the periphery of said housing.

References Cited in the file of this patent

UNITED STATES PATENTS

| | | |
|---|---|---|
| 1,063,636 | Barbezat | June 3, 1913 |

FOREIGN PATENTS

| | | |
|---|---|---|
| 285,775 | Great Britain | Feb. 23, 1928 |
| 495,493 | Italy | Jan. 15, 1954 |